United States Patent
Song et al.

(10) Patent No.: US 12,448,672 B2
(45) Date of Patent: Oct. 21, 2025

(54) GRAIN-ORIENTED ELECTRICAL STEEL SHEET AND METHOD FOR PRODUCING SAME

(71) Applicant: POSCO, Pohang-si (KR)

(72) Inventors: Dae-Hyun Song, Pohang-si (KR); Junesoo Park, Pohang-si (KR); Sang-Woo Lee, Pohang-si (KR)

(73) Assignee: POSCO, Pohang-si (KR)

( * ) Notice: Subject to any disclaimer, the term of this patent is extended or adjusted under 35 U.S.C. 154(b) by 579 days.

(21) Appl. No.: 17/787,308

(22) PCT Filed: Dec. 9, 2020

(86) PCT No.: PCT/KR2020/017982
§ 371 (c)(1),
(2) Date: Jun. 18, 2022

(87) PCT Pub. No.: WO2021/125686
PCT Pub. Date: Jun. 24, 2021

(65) Prior Publication Data
US 2023/0036436 A1 Feb. 2, 2023

(30) Foreign Application Priority Data

Dec. 20, 2019 (KR) .................. 10-2019-0171869

(51) Int. Cl.
| | | |
|---|---|---|
| *C21D 8/12* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/18* | (2006.01) | |
| *C22C 38/60* | (2006.01) | |

(52) U.S. Cl.
CPC ............ *C22C 38/02* (2013.01); *C21D 8/0205* (2013.01); *C21D 8/0226* (2013.01); *C21D 8/0236* (2013.01); *C21D 8/0257* (2013.01); *C21D 8/0273* (2013.01); *C21D 8/0278* (2013.01); *C21D 9/46* (2013.01); *C22C 38/001* (2013.01); *C22C 38/008* (2013.01); *C22C 38/04* (2013.01); *C22C 38/18* (2013.01); *C22C 38/60* (2013.01); *C21D 2201/05* (2013.01)

(58) Field of Classification Search
CPC .. C21D 8/0205; C21D 8/0226; C21D 8/0236; C21D 8/0273; C21D 8/0278; C21D 8/1222; C21D 8/1233; C21D 8/1244; C21D 8/1272; C21D 8/1283

See application file for complete search history.

(56) References Cited

U.S. PATENT DOCUMENTS

| | | | |
|---|---|---|---|
| 2015/0155085 A1 | 6/2015 | Gabor et al. | |
| 2015/0318094 A1* | 11/2015 | Shingaki | H01F 1/16 148/307 |
| 2018/0171425 A1 | 6/2018 | Shingaki et al. | |

FOREIGN PATENT DOCUMENTS

| | | |
|---|---|---|
| CN | 107881411 A | 4/2018 |
| JP | H02-263923 A | 10/1990 |
| JP | H02-263924 A | 10/1990 |
| JP | H02-274815 A | 11/1990 |
| JP | H04-297524 A | 10/1992 |
| JP | H04-297525 A | 10/1992 |
| JP | H04-329830 A | 11/1992 |
| JP | H05-125445 A | 5/1993 |
| JP | H05-295443 A | 11/1993 |
| JP | H06-145801 A | 5/1994 |
| JP | H07-138641 A | 5/1995 |
| JP | H08-269561 A | 10/1996 |
| JP | H09-194940 A | 7/1997 |
| JP | H11-241120 A | 9/1999 |
| JP | 2002-129236 A | 5/2002 |
| JP | 2003-166019 A | 6/2003 |
| JP | 4283533 B2 | 6/2009 |
| JP | 2015-52589 A | 3/2015 |
| JP | 2017-133080 A | 8/2017 |
| JP | 2017-186587 A | 10/2017 |
| JP | 2018-70974 A | 5/2018 |
| JP | 2019-094571 A | 6/2019 |
| KR | 10-1994-0008934 A | 9/1994 |
| KR | 10-1995-0011625 A | 5/1995 |
| KR | 10-1999-0032691 A | 5/1999 |
| KR | 10-0701195 B1 | 3/2007 |
| KR | 10-2014-0059354 A | 5/2014 |
| KR | 10-1539751 B1 | 7/2015 |
| KR | 10-2016-0078133 A | 7/2016 |
| KR | 10-1667617 B1 | 10/2016 |
| KR | 10-1676630 B1 | 11/2016 |
| KR | 10-2019-0077964 A | 7/2019 |
| WO | 2018/117639 A1 | 6/2018 |
| WO | 2018/117671 A1 | 6/2018 |
| WO | 2019/132357 A1 | 7/2019 |
| WO | 2019/132379 A1 | 7/2019 |

OTHER PUBLICATIONS

Chinese Office Action dated Feb. 9, 2023 issued in Chinese Patent Application No. 202080089021.9.

(Continued)

*Primary Examiner* — Jessee R Roe
(74) *Attorney, Agent, or Firm* — Morgan Lewis & Bockius LLP

(57) ABSTRACT

A grain-oriented electrical steel sheet according to an embodiment of the present invention may comprise: by weight %, 2.0-4.0% of Si, 0.04-0.2% of Mn, 0.010% or less (exclusive of 0%) of N, 0.01-0.05% of Sb, 0.005% or less (exclusive of 0%) of C, 0.03-0.08% of Sn, 0.01-0.2% of Cr, and the balance of Fe and inevitable impurities; and precipitates which have an average particle size of 5-50 nm and contain at least one of AlN, (Al, Si)N, (Al, Si, Mn)N, Mns, and CuS.

5 Claims, 6 Drawing Sheets

(56) References Cited

OTHER PUBLICATIONS

Extended Search Report issued Jun. 27, 2023 for corresponding European Patent Application No. 20902048.6.
International Search Report and Written Opinion issued in corresponding International Application No. PCT/KR2020/017982 dated Mar. 5, 2021, with English translation.
Office Action issued Aug. 1, 2023 for corresponding Japanese Patent Application No. 2022-538330.

* cited by examiner

GRAIN-ORIENTED ELECTRICAL STEEL SHEET AND METHOD FOR PRODUCING SAME

CROSS REFERENCE

This application is the U.S. National Phase under 35 U.S.C. § 371 of International Application No. PCT/KR2020/017982 filed on Dec. 9, 2020, which claims the benefit of Korean Application No. 10-2019-0171869 filed on Dec. 20, 2019, the entire contents of each are hereby incorporated by reference.

TECHNICAL FIELD

The present invention relates to a grain-oriented electrical steel sheet and a method for producing the same. In particular, the present invention relates to a grain-oriented electrical steel sheet, which may suppress deterioration of magnetism, even when a hot rolled plate annealing step is omitted, by appropriately controlling contents of C, Cr, Sn, and Sb, and a method for producing the same.

BACKGROUND ART

A grain-oriented electrical steel sheet is a soft magnetic material which shows a Goss texture in which a steel piece texture is {110}<001> in a rolling direction, and thus, has excellent magnetic properties in one direction or a rolling direction. In order to express the texture to improve the magnetic properties of the grain-oriented electrical steel sheet, complicated processes such as controlling components in steelmaking, reheating a slab and controlling hot rolling process factors in hot rolling, hot rolled plate annealing heat treatment, cold rolling, first recrystallization annealing, and second recrystallization annealing are required, and very precise and strict management is needed.

Among them, a hot rolled plate annealing process is an essential process for uniformly controlling the non-uniform microstructure and precipitates of a hot rolled plate after hot rolling, thereby causing Goss orientation crystal grains to undergo second recrystallization during second recrystallization annealing. However, since hot rolled plate annealing is a factor to increase the production costs of a grain-oriented electrical steel sheet, if the microstructure and the precipitates of a hot rolled plate are made uniform while simultaneously omitting hot rolled plate annealing, the production costs by a hot rolled plate annealing process may be reduced and productivity may be improved.

A thermal deviation in a skid during slab heating inevitably occurs, resulting in hot rolled plate precipitates and microstructure non-uniformity. When hot rolled plate annealing is omitted, the thermal deviation described above may not be reduced, which eventually leads to deepening of a magnetic deviation and, in a severe case, magnetic deterioration of a finally produced grain-oriented electrical steel sheet.

Though various attempts for omitting hot rolled plate annealing have been made, there was no technology which directly suggests a solution to a technology for decreasing a thermal deviation in a skid in a heating furnace during slab heating and a technology to eliminate precipitate and microstructure non-uniformity.

DISCLOSURE

Technical Problem

The present invention has been made in an effort to provide a grain-oriented electrical steel sheet and a method for producing the same. Specifically, the present invention has been made in an effort to provide a grain-oriented electrical steel sheet having advantages of suppressing deterioration of magnetism, even when a hot rolled plate annealing step is omitted, by appropriately controlling contents of C, Cr, Sn, and Sb, and a method for producing the same.

Technical Solution

An exemplary embodiment of the present invention provides a grain-oriented electrical steel sheet including, by weight: 2.0 to 4.0% of Si, 0.04 to 0.2% of Mn, 0.010% or less (exclusive of 0%) of N, 0.01 to 0.05% of Sb, 0.005% or less (exclusive of 0%) of C, 0.03 to 0.08% of Sn, and 0.01 to 0.2% of Cr, with a balance of Fe and inevitable impurities, wherein precipitates having an average particle diameter of 5 to 50 nm and including one or more of AlN, (Al, Si)N, (Al, Si, Mn)N, Mns, and CuS are included.

According to an embodiment of the present invention, the grain-oriented electrical steel sheet may have an area fraction of crystal grains having a crystal grain particle diameter of 1 mm or less of 10% or less.

According to an embodiment of the present invention, the grain-oriented electrical steel sheet may further include 0.005 to 0.030 wt % of Al.

According to an embodiment of the present invention, the grain-oriented electrical steel sheet may further include 0.010 wt % or less of S.

According to an embodiment of the present invention, the grain-oriented electrical steel sheet may further include 0.0005 to 0.045 wt % of P.

According to an embodiment of the present invention, the grain-oriented electrical steel sheet may further include one or more of 0.1 wt % or less of Co, 0.1 wt % or less of Ni, and 0.1 wt % or less of Mo.

Another embodiment of the present invention provides a method for producing a grain-oriented electrical steel sheet, including: hot rolling a slab which includes, by weight: 2.0 to 4.0% of Si, 0.04 to 0.2% of Mn, 0.010% or less (exclusive of 0%) of N, 0.01 to 0.05% of Sb, 0.001 to 0.04% of C, 0.03 to 0.08% of Sn, and 0.01 to 0.2% of Cr, with a balance of Fe and inevitable impurities, and satisfies the following Equation 1 to produce a hot rolled steel sheet; winding the hot rolled steel sheet; cooling the wound hot rolled steel sheet as it is and performing cold rolling to produce a cold rolled steel sheet; subjecting the cold rolled steel sheet to first recrystallization annealing; and subjecting the cold rolled steel sheet after the first recrystallization annealing to second recrystallization annealing:

$$0.038 \times [Si] - 0.069 - [N] \leq [C] \leq 0.038 \times [Si] - 0.069 + [N] \quad \text{[Equation 1]}$$

wherein [Si], [N], and [C] represent contents (wt %) of Si, N, and C in the slab, respectively.

Before producing the hot rolled steel sheet, heating to 1300° C. or lower may be further included.

After the winding and before the producing of a cold rolled steel sheet, there may be no heat treatment of applying heat from the outside of the steel sheet.

The producing of a cold rolled steel sheet may include cold rolling the hot rolled steel sheet once.

The subjecting to first recrystallization annealing may include decarburizing and nitriding, and the nitriding may be performed after the decarburizing, the decarburizing may be performed after the nitriding, or the decarburizing and the nitriding may be performed simultaneously.

After the subjecting to first recrystallization annealing, applying an annealing separating agent may be further included.

In the subjecting to second recrystallization annealing, second recrystallization may be completed at a temperature of 900 to 1210° C.

Advantageous Effects

The grain-oriented electrical steel sheet according to an exemplary embodiment of the present invention has a reduced thermal deviation in a skid in a heating furnace during slab heating, thereby eliminating precipitate and microstructure non-uniformity even when hot rolled plate annealing is omitted.

Eventually, the magnetism of the grain-oriented electrical steel sheet may be improved even when hot rolled plate annealing is omitted.

MODE FOR INVENTION

Figure 1:
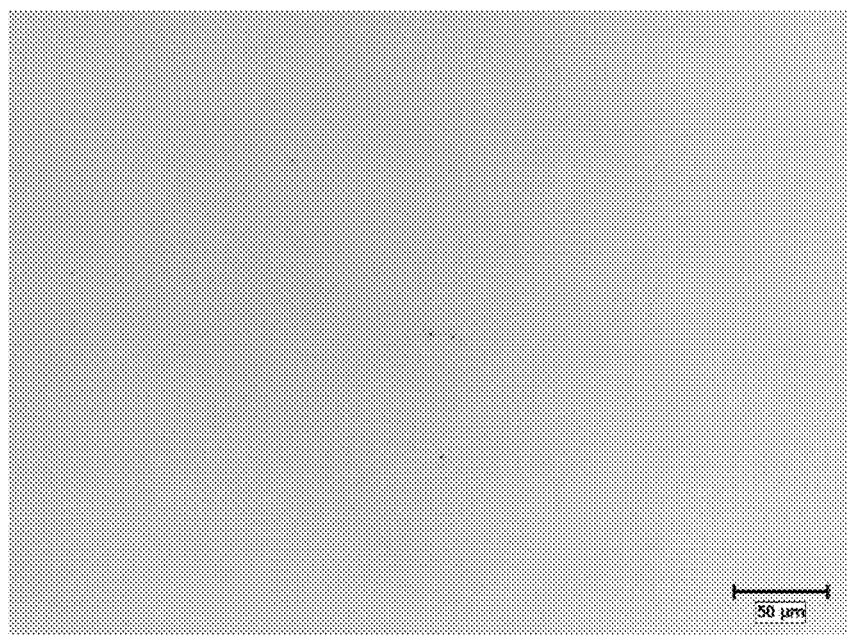
FIG. 1 is a photograph in which precipitates are analyzed in Inventive Material 1.
Figure 2:
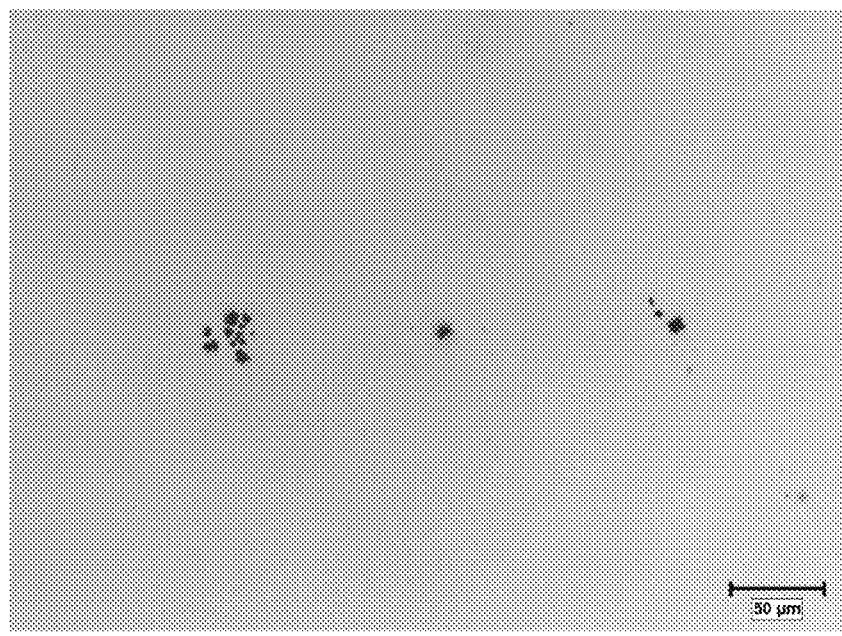
FIG. 2 is a photograph in which precipitates are analyzed in Comparative Material 1.

The terms such as first, second, and third are used for describing various parts, components, areas, layers, and/or sections, but are not limited thereto. These terms are used only for distinguishing one part, component, area, layer, or section from other parts, components, areas, layers, or sections. Therefore, a first part, component, area, layer, or section described below may be mentioned as a second part, component, area, layer, or section without departing from the scope of the present invention.

The terminology used herein is only for mentioning a certain example, and is not intended to limit the present invention. Singular forms used herein also include plural forms unless otherwise stated clearly to the contrary. The meaning of "comprising" used in the specification is embodying certain characteristics, regions, integers, steps, operations, and/or components, but is not excluding the presence or addition of other characteristics, regions, integers, steps, operations, and/or components.

When it is mentioned that a part is present "on" the other part, the part may be present directly on the other part, or another part may be involved between them. In contrast, when it is mentioned that a part is present "directly on" the other part, there is no part interposed between them.

Though not defined otherwise, all terms including technical terms and scientific terms used herein have the same meaning as commonly understood by a person with ordinary skill in the art to which the present invention pertains. Terms defined in commonly used dictionaries are further interpreted as having a meaning consistent with the related technical literatures and the currently disclosed description, and unless otherwise defined, they are not interpreted as having an ideal or very formal meaning.

In addition, unless otherwise particularly stated, % means wt %, and 1 ppm is 0.0001 wt %.

The meaning of further including an additional element in an exemplary embodiment of the present invention is including an additional element in place of iron (Fe) as a balance at the added amount of the additional element.

Hereinafter, an exemplary embodiment of the present invention will be described in detail so that a person with ordinary skill in the art to which the present invention pertains may easily practice the invention. As those skilled in the art would realize, the described embodiments may be modified in various different ways, all without departing from the spirit or scope of the present invention.

The grain-oriented electrical steel sheet according to an exemplary embodiment of the present invention includes, by weight: 2.0 to 4.0% of Si, 0.04 to 0.2% of Mn, 0.010% or less (exclusive of 0%) of N, 0.01 to 0.05% of Sb, 0.005% or less (exclusive of 0%) of C, 0.03 to 0.08% of Sn, and 0.01 to 0.2% of Cr, with a balance of Fe and inevitable impurities.

Hereinafter, the reason for limiting alloy components will be described.

Si: 2.0 to 4.0 wt %

Silicon (Si) is a basic composition of an electrical steel sheet and serves to increase the resistivity of a material to lower a core loss. When a Si content is too low, resistivity is decreased to increase an eddy current loss to deteriorate iron loss characteristics, and phase transformation between ferrite and austenite during the first recrystallization annealing is active to seriously damage a first recrystallization texture. In addition, phase transformation between ferrite and austenite occurs during the second recrystallization annealing to make second recrystallization unstable and severely damage a Goss texture. Meanwhile, when a Si content is excessive, $SiO_2$ and $Fe_2SiO_4$ oxide layers are excessive during the first recrystallization annealing and decarburization behavior is delayed, so that phase transformation between ferrite and austenite continuously occurs during the first recrystallization annealing treatment, thereby severely damaging the first recrystallization texture. In addition, since nitrification behavior is also delayed by a decarburization behavior delay effect due to the formation of a dense oxidation layer described above, nitrides such as (Al, Si, Mn)N and AlN are not sufficiently formed, so that a sufficient crystal grain suppressing force required for the second recrystallization during high temperature annealing may not be secured.

In addition, when Si is included in an excessive amount, brittleness which is a mechanical characteristic is increased and toughness is decreased to exacerbate a plate fracture rate during a rolling process and deteriorate inter-plate weldability, so that easy workability may not be secured. As a result, in the case in which the Si content is not controlled to the predetermined range, second recrystallization formation becomes unstable to severely damage magnetic properties and also deteriorate workability. Therefore, Si may be included at 2.0 to 4.0 wt %. More specifically, Si may be included at 2.1 to 3.5 wt %.

Mn: 0.04 to 0.2 wt %

Manganese (Mn) increases resistivity like Si to decrease an eddy current loss, thereby decreasing an entire iron loss, reacts with S in a lull state to form a Mn-based sulfide, reacts with nitrogen introduced by a nitrification treatment with Si to form precipitates of (Al, Si, Mn)N to suppress the growth of first recrystallized grains to cause second recrystallization, and affects the surface quality of a final product. When Mn is too little, the surface quality of a final product may be poor. When Mn is too much, an austenite phase fraction is much increased to damage a Goss texture and decrease a magnetic flux density, so that an oxide layer may be excessively formed to hinder decarburization. Therefore, Mn may be included at 0.04 to 0.20 wt %. More specifically, Mn may be included at 0.07 to 0.15 wt %.

N: 0.010 wt % or less

Nitrogen (N) is an important element which reacts with Al to form Al-based nitrides, and may be added at 0.010 wt % or less to the slab. When N is too much in the slab, surface defects called Blister by nitrogen diffusion are caused in a process after hot rolling, and nitrides are formed too much in a slab state to make rolling difficult, so that a subsequent process becomes complicated and production costs are increased. More specifically, N may be included at 0.005 wt % or less. Meanwhile, N which is further required to form nitrides such as (Al, Si, Mn)N, AlN, and (Si, Mn)N may be reinforced by performing a nitriding treatment in a steel using ammonia gas in an annealing process after cold rolling. However, since N is removed again in the second recrystallization annealing process, N remaining in the final electrical steel sheet may be at 0.010 wt % or less.

Sb: 0.01 to 0.05 wt %

Antimony (Sb) is segregated in a crystal grain boundary to have an effect of suppressing the growth of crystal grains and an effect of stabilizing second recrystallization. However, since it has a low melting point, it is easily diffused to a surface during decarburization annealing, that is, first recrystallization annealing, and thus, has an effect of hindering decarburization, oxidation layer formation, and nitridation. Therefore, when Sb is added at a certain level or more, decarburization is hindered and the formation of an oxide layer which is a basic of a base coating is suppressed, and thus, there is an upper limit of the content. Therefore, Sb may be included at 0.01 to 0.05 wt %. More specifically, Sb may be included at 0.02 to 0.05 wt %.

C: 0.001 to 0.04 wt %

Carbon (C) is an element which causes phase transformation between ferrite and austenite to contribute grain refining and elongation improvement, and is an element essential for improving the rollability of an electrical steel sheet which is very brittle to have not-good rollability. When C as such remains in a final product, carbides formed by a magnetic aging effect are precipitated in a product plate to deteriorate magnetic properties, and thus, it is preferred to control the content appropriately. When C is included too little in the slab, phase transformation between ferrite and austenite does not sufficiently occur to cause non-uniformity of the slab and the hot rolled microstructure. Thus, precipitates are coarse and non-uniform to make second recrystallization unstable and damage even cold rollability performed after hot rolling. In addition, precipitates and microstructure non-uniformity may occur by thermal deviation in a skid in a heating furnace during slab heating. When C is included too much in the slab, carbides become too coarse and a precipitation amount is excessively increased, so that decarburization is not sufficiently performed to decrease the packing density of the Goss texture to severely damage the second recrystallization texture, and furthermore, to cause deterioration of magnetic properties of a final product by magnetic aging. Therefore, a C content in the slab may be 0.001 to 0.040 wt %. More specifically, the C content in the slab may be 0.001 to 0.030 wt %. Meanwhile, in order to minimize occurrence of magnetic aging during the use of the final product, that is, the grain-oriented electrical steel sheet, the C content of the final grain-oriented electrical steel sheet product after second recrystallization annealing may be 0.005 wt % or less.

Sn: 0.03 to 0.08 wt %

Tin (Sn), which is a crystal grains-based segregation element, is an element which hinders movement of a crystal grain boundary, and thus, is known as a crystal grain growth inhibitor. Within the range of a Si content in an exemplary embodiment of the present invention, a crystal grain growth suppressing force for smooth second recrystallization behavior is insufficient, and thus, Sn which is segregated in a crystal grain boundary to hinder the movement of the crystal grain boundary is necessarily required. When Sn is included too little, it is difficult to appropriately exert the effect described above. On the contrary, when Sn is added excessively, unless a heating speed is adjusted or maintained for a certain period of time in a first recrystallization annealing section, a grain growth suppressing force is too high, so that stable second recrystallization may not be obtained. Therefore, the Sn content may be 0.03 to 0.08 wt %. More specifically, the Sn content may be 0.03 to 0.07 wt %.

Cr: 0.01 to 0.2 wt %

Chromium (Cr) promotes the formation of a hard phase in a hot rolled plate to promote the formation of {110}<001> of a Goss texture during cold rolling, and promotes decarburization during the first recrystallization annealing process, thereby decreasing an austenite phase transformation retention time so that a phenomenon in which the austenite phase transformation retention time is extended to damage a texture may be prevented. In addition, Cr promotes the formation of an oxidation layer on the surface formed during the first recrystallization annealing process, thereby overcoming a drawback of inhibiting the formation of an oxidation layer by Sn and Sb among alloy elements used as a crystal grain growth aid inhibitor. When Cr is included little, it is difficult to appropriately exert the effect described above. On the contrary, when Cr is added in an excessive amount, a denser oxidation layer is formed when an oxidation layer is formed during the first recrystallization annealing process, so that the formation of an oxidation layer is rather deteriorated and even decarburization and nitridation may be hindered. Therefore, Cr may be included at 0.01 to 0.2 wt %. More specifically, Cr may be included at 0.03 to 0.1 wt %.

The slab according to an exemplary embodiment of the present invention satisfies the following Equation 1:

$$0.038\times[Si]-0.069-[N] \leq [C] \leq 0.038\times[Si]-0.069+[N] \quad \text{[Equation 1]}$$

wherein [Si], [N], and [C] represent contents (wt %) of Si, N, and C in the slab, respectively.

When the C content is controlled depending on the Si and N contents in the slab as in Equation 1, precipitates are almost or completely solubilized in the step of slab heating and hot rolling and then are precipitated very uniformly, and thus, even when hot rolled plate annealing is omitted, an adverse effect by a thermal deviation in a skid in a heating furnace in slab heating may be reduced or prevented, and an average particle diameter of residual precipitates which deteriorate magnetism after the second recrystallization annealing is 5 to 50 nm, which is very effective in securing stable magnetic properties. Meanwhile, the average particle diameter of the residual precipitates may be measured by removing all oxide layers on the surface after the second recrystallization annealing, polishing the surface by about 50 to 100 μm to manufacture a replica specimen, and performing image analysis from a photograph taken by TEM. A measurement reference plane is parallel to a rolling plane.

The average particle diameter of the precipitates described above is 5 to 50 nm, and may include AlN, (Al, Si)N, (Al, Si, Mn)N, MnS, or CuS. As described above, the thermal deviation in the skid in the heating furnace during slab heating may be decreased by the C content in the slab and Equation 1. Thereafter, a hot rolled plate annealing process may be omitted from the process to suppress the growth of precipitates by the thermal deviation in the skid.

When precipitates are too little, hot rolled plate annealing has been performed, which is not fit for the purpose of an exemplary embodiment of the present invention. When precipitates are too much, magnetism may be deteriorated.

By forming the precipitates as such, second recrystallization may completely occur in the second recrystallization annealing process even when hot rolled plate annealing is omitted. Specifically, an area fraction of crystal grains having a crystal grain particle diameter of 1 mm or less may be 10% or less. The crystal grain particle diameter and fraction may be based on plane parallel to a rolling plane (ND plane). The average particle diameter is calculated by assuming an imaginary circle having the same area as crystal grains and taking the particle diameter of the circle.

The crystal grain may have an average particle diameter of 0.1 to 5 cm.

The grain-oriented electrical steel sheet according to an exemplary embodiment of the present invention may further include 0.005 to 0.030 wt % of Al. As described above, when an additional element is further included, it is added in place of Fe as a balance.

Al: 0.005 to 0.030 wt %

Aluminum (Al) forms Al-based nitrides precipitated in the hot rolling, and also a nitrogen ion introduced by ammonia gas in the annealing process after cold rolling bonds to Al, Si, and Mn present in a solid-solubilized state in steel to form nitrides in the form of (Al, Si, Mn)N and AlN, and thus, Al serves as a powerful crystal grain growth inhibitor. When the content is too low, the number formed and the volume are significantly small, and thus, a sufficient effect as an inhibitor may not be expected. On the contrary, when the content is too high, the Al-based nitrides become too coarse to deteriorate the crystal grain growth suppressing force. In addition, the Al-based nitride is not completely solubilized during slab reheating, so that precipitates having very non-uniform size and distribution are precipitated after slab reheating to make second recrystallization behavior unstable, and thus, the magnetic properties of a final product may be deteriorated or the deviation may be increased. Therefore, when Al is further included, the content may be 0.005 to 0.030 wt %. More specifically, Al may be included at 0.015 to 0.030 wt %.

The grain-oriented electrical steel sheet according to an exemplary embodiment of the present invention may further include 0.010 wt % or less of S.

S: 0.010 wt % or less

When sulfur (S) is added too much, it is segregated in the center of the slab so that precipitates of sulfides such as MnS and CuS are non-uniformly precipitated to derive the first recrystallization microstructure non-uniformly to make the second recrystallization unstable. Therefore, when S is further included, the content may be 0.010 wt % or less. In addition, since it takes a huge amount of time and money to control desulfurization at the lowest, the lower limit may be more than 0%. In an exemplary embodiment of the present invention, the lower limit is not particularly defined.

P: 0.005 to 0.045 wt %

Phosphorus (P) is segregated in a crystal grain boundary to hinder the movement of the crystal grain boundary, plays an auxiliary role to suppress crystal grain growth, and improves the {110}<001> texture in terms of a microstructure. When P is added, if the added amount is too small, there is no addition effect. On the contrary, if the added amount is too large, brittleness is increased to greatly deteriorate rollability. Therefore, when P is further included, P may be included at 0.005 to 0.045 wt %. More specifically, P may be included at 0.01 to 0.035 wt %.

The grain-oriented electrical steel sheet according to an exemplary embodiment of the present invention may further include one or more of 0.1 wt % or less of Co, 0.1 wt % or less of Ni, and 0.1 wt % or less of Mo.

Co: 0.1 wt % or less

Cobalt (Co) is an alloy element which is effective in increasing the magnetization of iron to improve a magnetic flux density while also increasing resistivity to decrease an iron loss. When Co is appropriately added, the above effect may be further obtained. When Co is added too much, an austenite phase transformation amount is increased to adversely affect a microstructure, precipitates and a texture. Therefore, when Co is added, it may be further included at 0.1 wt % or less. More specifically, it may be further included at 0.005 to 0.05 wt %.

Ni and Mo may be also added at an upper limit of 0.1 wt %.

As a balance, iron (Fe) is included. Also, inevitable impurities may be included. The inevitable impurities mean impurities which are inevitably incorporated in steel making and in the production process of the grain-oriented electrical steel sheet. Since the inevitable impurities are well known, detailed description thereof will be omitted. In an exemplary embodiment of the present invention, addition of an element other than the alloy components described above is not excluded, and various elements may be included within a range not impairing the technical idea of the present invention. When an addition element is further included, it is included in place of Fe as the balance.

The method for producing a grain-oriented electrical steel sheet according to an exemplary embodiment of the present invention includes: hot rolling a slab to produce a hot rolled steel sheet; winding the hot rolled steel sheet; cooling the wound hot rolled steel sheet as it is and performing cold rolling to produce a cold rolled steel sheet; subjecting the cold rolled steel sheet to first recrystallization annealing; and subjecting the cold rolled steel sheet after the first recrystallization annealing to second recrystallization annealing.

Hereinafter, each step will be described in detail.

First, slab is hot rolled to produce a hot rolled steel sheet. Since the alloy composition of the slab was described in relation to the alloy composition of the grain-oriented electrical steel sheet, overlapping description will be omitted. Specifically, the slab includes, by weight: 2.0 to 4.0% of Si, 0.04 to 0.2% of Mn, 0.010% or less (exclusive of 0%) of N, 0.01 to 0.05% of Sb, 0.001 to 0.04% of C, 0.03 to 0.08% of Sn, and 0.01 to 0.2% of Cr, with a balance of Fe and inevitable impurities, and may satisfy the following Equation 1:

$$0.038 \times [Si] - 0.069 - [N] \leq [C] \leq 0.038 \times [Si] - 0.069 + [N] \quad \text{[Equation 1]}$$

wherein [Si], [N], and [C] represent contents (wt %) of Si, N, and C in the slab, respectively.

Returning to the description of the production method, before the producing of a hot rolled steel sheet, heating the slab to 1300° C. or lower may be further included.

Next, the slab is hot rolled to produce a hot rolled steel sheet. The hot rolled steel sheet may have a thickness of 5 mm or less.

Thereafter, the hot rolled steel sheet is wound.

Next, the wound hot rolled steel sheet is cooled as it is and cold rolled to produce a cold rolled steel sheet.

In an exemplary embodiment of the present invention, cooling as it is means no heat treatment of applying heat from the outside. That is, it means that a hot rolled plate annealing process is omitted. After the hot rolling, pickling is performed for removing hot rolled scale. When pickling is performed, shot blasting may be or may not be performed before or after pickling.

In the producing of a cold rolled steel sheet, the cold rolling including one cold rolling or intermediate annealing may be performed twice or more times. Specifically, it may include cold rolling hot rolled steel sheet once.

The cold rolled steel sheet may have a thickness of 0.65 mm or less. Meanwhile, when the cold rolling is performed, rolling may be performed so that a cold rolling reduction is 87% or more. It is because as the cold rolling reduction is increased, the packing density of the Goss texture is increased. However, a lower cold rolling reduction may be applied.

Next, the cold rolled plate is subjected to first recrystallization annealing. Here, the subjecting to first recrystallization annealing may include decarburizing and nitriding. The decarburizing and the nitriding may be performed out of sequence. That is, the nitriding may be performed after the decarburizing, the decarburizing is performed after the nitriding, or the decarburizing and the nitriding may be performed simultaneously. C may be decarburized to 0.005 wt % or less in the decarburizing. More specifically, C may be decarburized to 0.003 wt % or less. In the nitriding process, N may be nitrided to 0.015 wt % or less.

A cracking temperature in the first recrystallization annealing may be 840° C. to 900° C. Even when the first recrystallization annealing is performed at a temperature lower than 840° C. or at a temperature higher than 900° C., there is no problem with the functions suggested in the present invention.

After the subjecting to first recrystallization annealing, an annealing separating agent may be applied to the steel sheet. Since the annealing separating agent is well known, detailed description thereof will be omitted. As an example, an annealing separating agent having MgO as a main component may be used.

Next, a cold rolled plate subjected to the first recrystallization annealing is subjected to second recrystallization annealing.

The purpose of the second recrystallization annealing is largely to form a {110}<001> texture by second recrystallization, to impart insulation properties by forming a vitreous film by a reaction between MgO and an oxidation layer formed in the first recrystallization annealing, and to remove impurities which damage magnetic properties. In a method of the second recrystallization annealing, nitrides which are a particle growth suppressing agent are protected by maintenance with a mixed gas of nitrogen and hydrogen in a heating section before the second recrystallization occurs, thereby developing second recrystallization well, and after the second recrystallization is completed, impurities are removed in a cracking step by maintenance for a long time under a 100% hydrogen atmosphere.

In the subjecting to second recrystallization annealing, the second recrystallization may be completed at a temperature of 900 to 1210° C.

The grain-oriented electrical steel sheet according to an exemplary embodiment of the present invention is particularly excellent in an iron loss and magnetic flux density properties. The grain-oriented electrical steel sheet an exemplary embodiment of the present invention may have a magnetic flux density ($B_8$) of 1.85 T or more and an iron loss ($W_{17/50}$) of 1.10 W/kg or less. Here, the magnetic flux density ($B_8$) is a size of a magnetic flux density (Tesla), and the iron loss ($W_{17/50}$) is a size of iron loss (W/kg) derived under 1.7 Tesla and 50 Hz conditions. More specifically, the grain-oriented electrical steel sheet according to an exemplary embodiment of the present invention may have the magnetic flux density ($B_8$) of 1.90 T or more and the iron loss ($W_{17/50}$) of 1.00 W/kg or less.

Hereinafter, the specific examples of the present invention will be described in detail. However, the following examples are only a specific exemplary embodiment of the present invention, and the present invention is not limited to the following examples.

Example 1

A steel composition including by weight: 2.8% of Si, 0.09% of Mn, 0.026% or Al, 0.003% of N, 0.004% of S, 0.02% of Sb, 0.05% or Sn, 0.03% of P, 0.03% of Cr, with a C content being changed as shown in Table 1, and the remaining components including a balance of Fe and other inevitably contained impurities was dissolved under vacuum to make an ingot, which was then heated to a temperature of 1250° C., hot rolled to a thickness of 3.0 mm, pickled, and wound. Thereafter, cold rolling was performed at a thickness of 0.30 mmt without a heat treatment, and the cold rolled plate was subjected to a simultaneous decarburizing nitriding annealing heat treatment at a temperature of 860° C. under a mixed gas atmosphere of wet hydrogen, nitrogen, and ammonia so that a carbon content was 30 ppm and a nitrogen content was 190 ppm. Subsequently, MgO as an annealing separating agent was applied on a steel sheet and a final annealing heat treatment was performed, and in the final annealing heat treatment, heating to 1200° C. was performed under a mixed gas atmosphere of 25 vol % of nitrogen and 75 vol % of hydrogen and then after reaching the temperature of 1200° C., the temperature was maintained for 10 hours or more under a 100% hydrogen atmosphere, and furnace cooling was performed. The values of measuring the magnetic properties depending on the C content are as shown in Table 1.

The average particle diameter of the precipitates was measured by removing all oxide layers on the surface after the second recrystallization annealing, polishing the surface by about 100 μm to manufacture a replica specimen, and performing image analysis from a photo taken by TEM.

As to whether the second recrystallization occurred, when the area fraction of the crystal grains having a crystal grain particle diameter of 1 mm or less is more than 10%, it was determined that the second recrystallization was unstable or did not occur and was indicated as x.

TABLE 1

| C (wt %) | Average particle diameter of precipitates (nm) | Whether second recrystallization occurred | W17/50 (W/kg) | B8 (Tesla) | Remarks |
| --- | --- | --- | --- | --- | --- |
| 0.039 | 39 | ○ | 0.99 | 1.91 | Inventive Material 1 |
| 0.0389 | 21 | ○ | 1.02 | 1.85 | Inventive Material 2 |
| 0.038 | 16 | ○ | 1 | 1.87 | Inventive Material 3 |
| 0.0397 | 28 | ○ | 1.02 | 1.89 | Inventive Material 4 |
| 0.0386 | 6 | ○ | 1.01 | 1.87 | Inventive Material 5 |
| 0.0391 | 5 | ○ | 0.98 | 1.91 | Inventive Material 6 |
| 0.0352 | 27 | ○ | 0.99 | 1.85 | Inventive Material 7 |
| 0.0353 | 19 | ○ | 0.99 | 1.91 | Inventive Material 8 |
| 0.0348 | 43 | ○ | 1.02 | 1.9 | Inventive Material 9 |
| 0.0365 | 50 | ○ | 1.01 | 1.88 | Inventive Material 10 |
| 0.0599 | 119 | X | 1.45 | 1.77 | Comparative Material 1 |
| 0.0185 | 91 | X | 1.55 | 1.84 | Comparative Material 2 |
| 0.0561 | 134 | X | 1.64 | 1.81 | Comparative Material 3 |
| 0.0107 | 120 | X | 1.77 | 1.82 | Comparative Material 4 |
| 0.0475 | 119 | X | 1.75 | 1.84 | Comparative Material 5 |
| 0.0209 | 96 | X | 1.6 | 1.75 | Comparative Material 6 |
| 0.0466 | 117 | X | 1.56 | 1.75 | Comparative Material 7 |
| 0.0134 | 122 | X | 1.42 | 1.83 | Comparative Material 8 |
| 0.0513 | 84 | X | 1.59 | 1.75 | Comparative Material 9 |
| 0.0258 | 125 | X | 1.37 | 1.76 | Comparative Material 10 |

As shown in Table 1, the iron losses of the inventive materials and the comparative materials were 1.102 W/kg and 1.603 W/kg and the deviations were 0.02 W/kg and 0.14 W/kg, respectively, and thus, it is recognized that the iron loss of the inventive materials satisfying Equation 1 was excellent and stable as compared with that of the comparative materials. Meanwhile, the magnetic flux densities of the inventive materials and the comparative materials were 1.90 Tesla and 1.81 Tesla, respectively, and the deviations thereof were 0.022 Tesla and 0.035 Tesla, respectively, and thus, it is confirmed that the magnetic flux density of the inventive materials satisfying Equation 1 was also excellent and stable. Further, the average particle diameter of the precipitates of the comparative materials was 84 to 140 nm, while that of the inventive materials satisfied 5 to 50 nm.

As a result of analysis, the precipitates included AlN, (Al, Si, Mn)N, MnS, and CuS.

It is confirmed that this resulted from the fact that the size of the precipitates remaining in the final product was decreased to reduce the influence on magnetic properties.

Example 2

A steel composition including by weight: 0.09% of Mn, 0.027% or Al, 0.004% of S, 0.02% of Sb, 0.07% or Sn, 0.03% of P, 0.04% of Cr, with Si, C, and N contents being changed as shown in Table 2, and the remaining components including a balance of Fe and other inevitably contained impurities was dissolved under vacuum to make an ingot, which was then heated to a temperature of 1150° C., and hot rolled to a thickness of 2.3 mm. Thereafter, pickling was performed, cold rolling was performed once to a thickness of 0.23 mmt without a heat treatment, and the cold rolled sheet was subjected to simultaneous decarburizing nitriding annealing heat treatment at temperature of 850° C. under a mixed gas atmosphere of wet hydrogen, nitrogen, and ammonia so that a carbon content was 30 ppm and a nitrogen content was 170 ppm. Subsequently, MgO as an annealing separating agent was applied on a steel sheet and a final annealing heat treatment was performed, and in the final annealing heat treatment, heating to 1200° C. was performed under a mixed gas atmosphere of 25 vol % of nitrogen and 75 vol % of hydrogen and then after reaching the temperature of 1200° C., the temperature was maintained for 10 hours or more under a 100% hydrogen atmosphere, and furnace cooling was performed. The values measuring the magnetic properties after high temperature annealing depending on the Si, C, and N contents and the average particle diameter of remaining precipitates per 1 mm$^2$ are as shown in Table 2.

TABLE 2

| Si | C | N | W17/50 (W/kg) | B8 (Tesla) | Average particle diameter of precipitates (nm) | Whether second recrystallization occurred | Remarks |
| --- | --- | --- | --- | --- | --- | --- | --- |
| 2.78 | 0.0359 | 0.0011 | 0.81 | 1.89 | 23 | ○ | Inventive Material 11 |
| 2.82 | 0.0319 | 0.001 | 1.19 | 1.75 | 91 | X | Comparative Material 11 |
| 2.81 | 0.0446 | 0.0012 | 1.59 | 1.79 | 118 | X | Comparative Material 12 |
| 3.18 | 0.0413 | 0.0029 | 1.48 | 1.81 | 127 | X | Comparative Material 13 |
| 3.3 | 0.069 | 0.003 | 1.36 | 1.81 | 90 | X | Comparative Material 14 |
| 2.61 | 0.0314 | 0.0045 | 0.85 | 1.89 | 7 | ○ | Inventive Material 12 |
| 2.62 | 0.0195 | 0.0045 | 1.6 | 1.75 | 145 | X | Comparative Material 15 |
| 2.67 | 0.0446 | 0.0047 | 1.51 | 1.81 | 85 | X | Comparative Material 16 |
| 3.05 | 0.0335 | 0.0062 | 1.36 | 1.75 | 125 | X | Comparative Material 17 |
| 3 | 0.0592 | 0.0066 | 1.42 | 1.83 | 89 | X | Comparative Material 18 |
| 2.89 | 0.0236 | 0.0079 | 1.49 | 1.8 | 116 | X | Comparative Material 19 |
| 2.82 | 0.0532 | 0.0081 | 1.4 | 1.83 | 148 | X | Comparative Material 20 |

TABLE 2-continued

| Si | C | N | W17/50 (W/kg) | B8 (Tesla) | Average particle diameter of precipitates (nm) | Whether second recrystallization occurred | Remarks |
|---|---|---|---|---|---|---|---|
| 3.49 | 0.0443 | 0.0096 | 1.21 | 1.81 | 106 | X | Comparative Material 21 |
| 3.5 | 0.0829 | 0.01 | 1.73 | 1.79 | 81 | X | Comparative Material 22 |
| 2.42 | 0.0252 | 0.0115 | 0.81 | 1.91 | 30 | ○ | Inventive Material 13 |

As shown in Table 2, the iron losses of the inventive materials and the comparative materials were 0.831 W/kg and 1.445 W/kg and the deviations thereof were 0.02 W/kg and 0.15 W/kg, respectively, and thus, it is recognized that the iron loss of the inventive materials satisfying Equation 1 was excellent and stable as compared with that of the comparative materials. Meanwhile, the magnetic flux densities of the inventive materials and the comparative materials were 1.90 Tesla and 1.79 Tesla and the deviations thereof were 0.01 Tesla and 0.028 Tesla, respectively, and thus, it is confirmed that the magnetic flux density of the inventive materials satisfying Equation 1 was also excellent and stable. In addition, it is confirmed that the average particle diameter of the precipitates of the comparative materials was 81 to 148 nm, while that of the inventive materials satisfied 7 to 47 nm.

As a result of analysis, the precipitates included AlN, (Al, Si, Mn)N, MnS, and CuS.

It is confirmed that this resulted from the fact that the size of the precipitates remaining in the final product was decreased to reduce the influence on magnetic properties.

Example 3

The cases, in which the process was performed in the same manner as Inventive Material 11, but hot rolled plate annealing was omitted or performed after hot rolling, were compared.

TABLE 3

| Hot rolled plate annealing | W17/50 (W/kg) | B8 (Tesla) | Whether second recrystallization occurred | Remarks |
|---|---|---|---|---|
| Omitted | 0.81 | 1.89 | ○ | Inventive Material 11 |
| Performed | 0.81 | 1.89 | ○ | Comparative Material 23 |

As shown in Table 3, it is confirmed that even though the hot rolled plate annealing was omitted, magnetism was shown to correspond to the case of performing the hot rolled plate annealing.

Figure 3:
FIG. 3 is a photograph of a final grain-oriented electrical steel sheet produced from Inventive Material 11.
Figure 4:
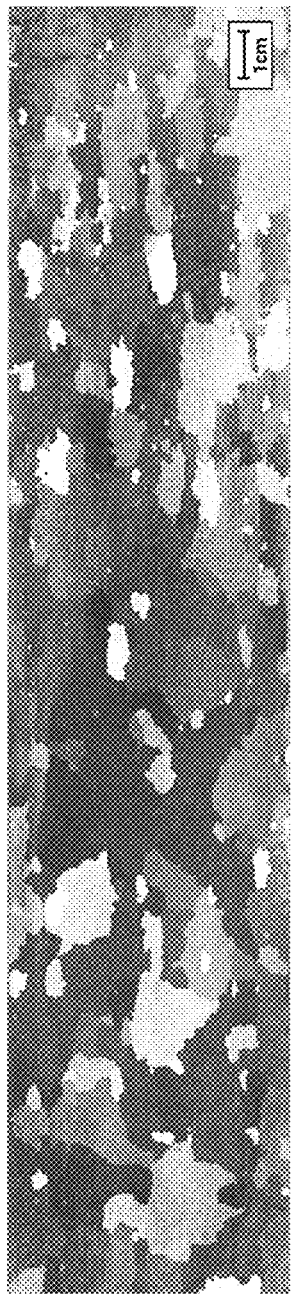
FIG. 4 is a photograph of a final grain-oriented electrical steel sheet produced from Comparative Material 23.

As shown in FIGS. 3 and 4, it is confirmed that second recrystallization occurred perfectly in Inventive Material 11 and Comparative Material 23. In particular, it is confirmed that in Inventive Material 11, the second recrystallization occurred perfectly even though the hot rolled plate annealing was omitted.

Figure 5:
FIG. 5 is a photograph of a final grain-oriented electrical steel sheet produced from Comparative Material 11.
Figure 6:
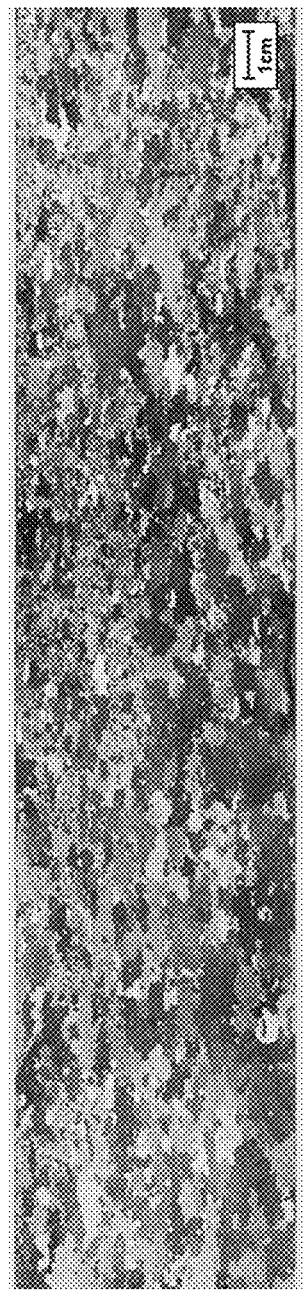
FIG. 6 is a photograph of a final grain-oriented electrical steel sheet produced from Comparative Material 12.

However, as shown in FIGS. 5 and 6, it is confirmed that second recrystallization did not occur perfectly in Comparative Materials 11 and 12 in which the alloy components were not appropriately controlled. That is, it is confirmed that there were a plurality of crystal grains having a particle diameter of 1 mm or less.

The present invention is not limited to the implementations and/or the exemplary embodiments, but may be produced in various forms different from each other. A person with ordinary skill in the art to which the present invention pertains will understand that the present invention may be carried out in other specific forms without changing the technical idea or the essential feature of the present invention. Therefore, the implementations and/or the exemplary embodiments described above should be understood to be illustrative in all respects, and not to be restrictive.

The invention claimed is:

1. A grain-oriented electrical steel sheet comprising, by weight: 2.0 to 4.0% of Si, 0.04 to 0.2% of Mn, 0.010% or less (exclusive of 0%) of N, 0.01 to 0.05% of Sb, 0.005% or less (exclusive of 0%) of C, 0.03 to 0.08% of Sn, 0.01 to 0.2% of Cr, and 0.015 to 0.030 wt % of Al, with a balance of Fe and inevitable impurities, wherein precipitates having an average particle diameter of 5 to 50 nm and including one or more of AlN, (Al, Si)N, (Al, Si, Mn)N, Mns, and CuS are included, and wherein an area fraction of crystal grains having a crystal grain particle diameter of 1 mm or less is 10% or less.

2. The grain-oriented electrical steel sheet of claim 1, further comprising:

0.010 wt % or less of S.

3. The grain-oriented electrical steel sheet of claim 1, further comprising:

0.0005 to 0.045 wt % of P.

4. The grain-oriented electrical steel sheet of claim 1, further comprising:

one or more of 0.1 wt % or less of Co, 0.1 wt % or less of Ni, and 0.1 wt % or less of Mo.

5. The grain-oriented electrical steel sheet of claim 1, further comprising:

0.010 wt % or less of S, 0.0005 to 0.045 wt % of P, and one or more of 0.1 wt % or less of Co, 0.1 wt % or less of Ni, and 0.1 wt % or less of Mo.

\* \* \* \* \*